(12) United States Patent
Chauhan et al.

(10) Patent No.: US 11,507,907 B2
(45) Date of Patent: Nov. 22, 2022

(54) MULTI-COMPUTER PROCESSING SYSTEM WITH MACHINE LEARNING ENGINE FOR OPTIMIZED FORECASTING

(71) Applicant: Bank of America Corporation, Charlotte, NC (US)

(72) Inventors: Sandeep Kumar Chauhan, Hyderabad (IN); Madhuri Aniruddha Deshpande, Mumbai (IN); Moses Salagala, Gachibowli, IN (US); Jagadish Reddy, Hyderabad, IN (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/116,109

(22) Filed: Dec. 9, 2020

(65) Prior Publication Data

US 2022/0180285 A1  Jun. 9, 2022

(51) Int. Cl.
| G06Q 10/06 | (2012.01) |
| G06N 20/00 | (2019.01) |
| G06N 5/04 | (2006.01) |
| G06Q 30/02 | (2012.01) |
| G06F 11/36 | (2006.01) |
| G06Q 10/10 | (2012.01) |
| G06Q 10/04 | (2012.01) |
| G06F 16/93 | (2019.01) |

(52) U.S. Cl.
CPC ... *G06Q 10/06375* (2013.01); *G06F 11/3616* (2013.01); *G06F 16/93* (2019.01); *G06N 5/04* (2013.01); *G06N 20/00* (2019.01); *G06Q 10/04* (2013.01); *G06Q 10/06315* (2013.01); *G06Q 10/06398* (2013.01); *G06Q 10/10* (2013.01); *G06Q 30/0201* (2013.01)

(58) Field of Classification Search
CPC combination set(s) only.
See application file for complete search history.

(56) References Cited

U.S. PATENT DOCUMENTS

| 9,654,594 | B2 | 5/2017 | B'Far et al. | |
| 2009/0012789 | A1* | 1/2009 | Gaudet | G06F 40/274 704/251 |
| 2017/0193420 | A1* | 7/2017 | Tiwari | G06Q 50/01 |
| 2018/0322467 | A1 | 11/2018 | Rammohan | |
| 2020/0183818 | A1* | 6/2020 | Guenther | G06F 11/3664 |
| 2020/0272994 | A1* | 8/2020 | Silveira | G06K 9/6267 |
| 2021/0326184 | A1* | 10/2021 | Muraleedharan | G06F 9/5077 |

\* cited by examiner

*Primary Examiner* — Arif Ullah
(74) *Attorney, Agent, or Firm* — Banner & Witcoff, Ltd.

(57) ABSTRACT

Systems for optimized forecasting are provided. In some examples, data associated with strategy of one or more business units may be received. The strategy data may include identification of projects or goals. In some examples, industry trend data may be received and may include data associated with in-demand job skills and the like. An instruction to capture user data may be transmitted to one or more user devices of an employee user. The instruction may cause activation of one or more sensors or data capture devices. The captured user data may be received and analyzed to determine a competency of the user. Based on the strategy data, industry data and determined competency, one or more deficiencies between the resources needed to meet the business unit strategy data and the available resources may be identified. Based on the identified deficiency, one or more actions for execution may be identified and executed.

15 Claims, 13 Drawing Sheets

MULTI-COMPUTER PROCESSING SYSTEM WITH MACHINE LEARNING ENGINE FOR OPTIMIZED FORECASTING

BACKGROUND

Aspects of the disclosure relate to electrical computers, systems, and devices performing optimized forecasting.

In large enterprise organizations, employees often perform a variety of roles. It can often be difficult to accurately evaluate performance of an employee in one or more role. In some conventional systems, the enterprise organization may rely on self-evaluations or self-reporting by the employee to obtain information related to competencies, performance, and the like. However, this can be inefficient and inaccurate.

In addition, conventional systems often do not operate in real-time and do not account for needs of one or more business units within the enterprise organization, industry trends, and the like.

Accordingly, aspects described herein are related to using machine learning to evaluate, in real-time or near real-time, performance of one or more employees, competencies of one or more employees, and the like, to identify gaps between current or future needs and the known skills of a current workforce or portion of a workforce.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with objectively identifying competency of a user and accurately identifying deficiencies between resources needed and resources available based, at least in part, on the identified competency.

For instance, in some examples, data associated with strategy of one or more business units may be received. The strategy data may include identification of projects or goals. In some examples, industry trend data may be received. The industry trend data may include data associated with in-demand job skills and the like. In some arrangements, an instruction to capture user data may be transmitted to one or more user devices of an employee user. The instruction may cause activation of one or more sensors or data capture devices. In some examples, user keystroke and/or other input data may be captured. The captured user data may be received and analyzed to determine a competency of the user.

Based on the strategy data, industry data and determined competency, one or more deficiencies between the resources needed to meet the business unit strategy data and the available resources may be identified. Based on the identified deficiency, one or more actions for execution may be identified and executed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
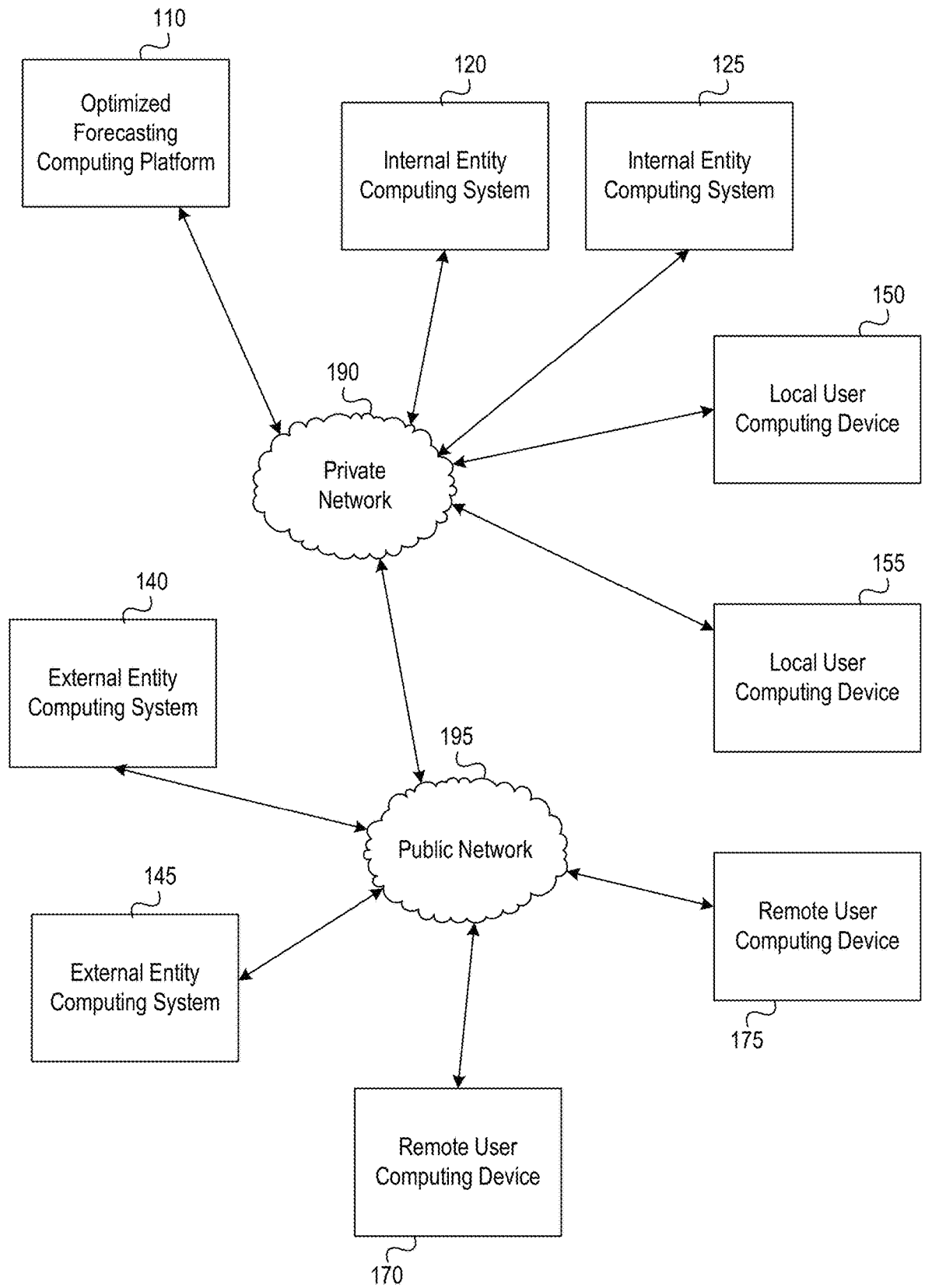
FIGS. 1A and 1B depict an illustrative computing environment for implementing optimized forecasting functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, objectively evaluating user performance and competency is an important aspect of managing a business. In addition, understanding resources needed to complete upcoming projects or meet goals, and accurately characterizing the resources available is also important. Conventional systems fail to provide this holistic approach to resource allocation.

Accordingly, aspects described herein are directed to objectively evaluating competency of users and using that information to predict available resources, allocate resources, and the like. In some examples, user data may be captured in real-time or near real-time and analyzed in real-time or near real-time in order to capture accurate data. Additionally or alternatively, user data may be continuously captured as the user executed one or more job functions to understand the real-time competency level of each user.

As discussed herein, enterprise strategy data may be received. The enterprise strategy data may include data associated with goals, projects, and the like of one or more enterprise business units. In some examples, external industry data may be received. The external industry data may include data associated with industry trends including in-demand job skills, such as in-demand educational backgrounds, in-demand programming skills, and the like.

In some examples, user data may be captured. For instance, user data may be captured via one or more user data capture devices at an enterprise user computing device. User data may include keystroke data, mouse input data, or the like. In some examples, user data may include work product generated by the user when performing a job task.

The user data may be analyzed (e.g., using machine learning) to determine a competency level of the user. For instance, keystroke data may be analyzed when the user is programming in a particular language to evaluate a number of errors made, defects identified and the like. The number of errors or defects may indicate a competency level of the user. In another example, work product may be analyzed to detect errors made, review comments provided, and the like. This information may then be used to evaluate or determine a competency level of the user with respect to the particular job task associated with preparation of the work product.

The enterprise strategy data and industry data may then be analyzed to identify resources needed to meet enterprise strategy goals and are compared to enterprise user competencies to understand resources available. Based on this evaluation, one or more deficiencies between resources needed and resources available may be identified. The system may then identify one or more actions for execution in order to reduce or eliminate the identified deficiency.

These and various other arrangements will be discussed more fully below.

Figure 1B:
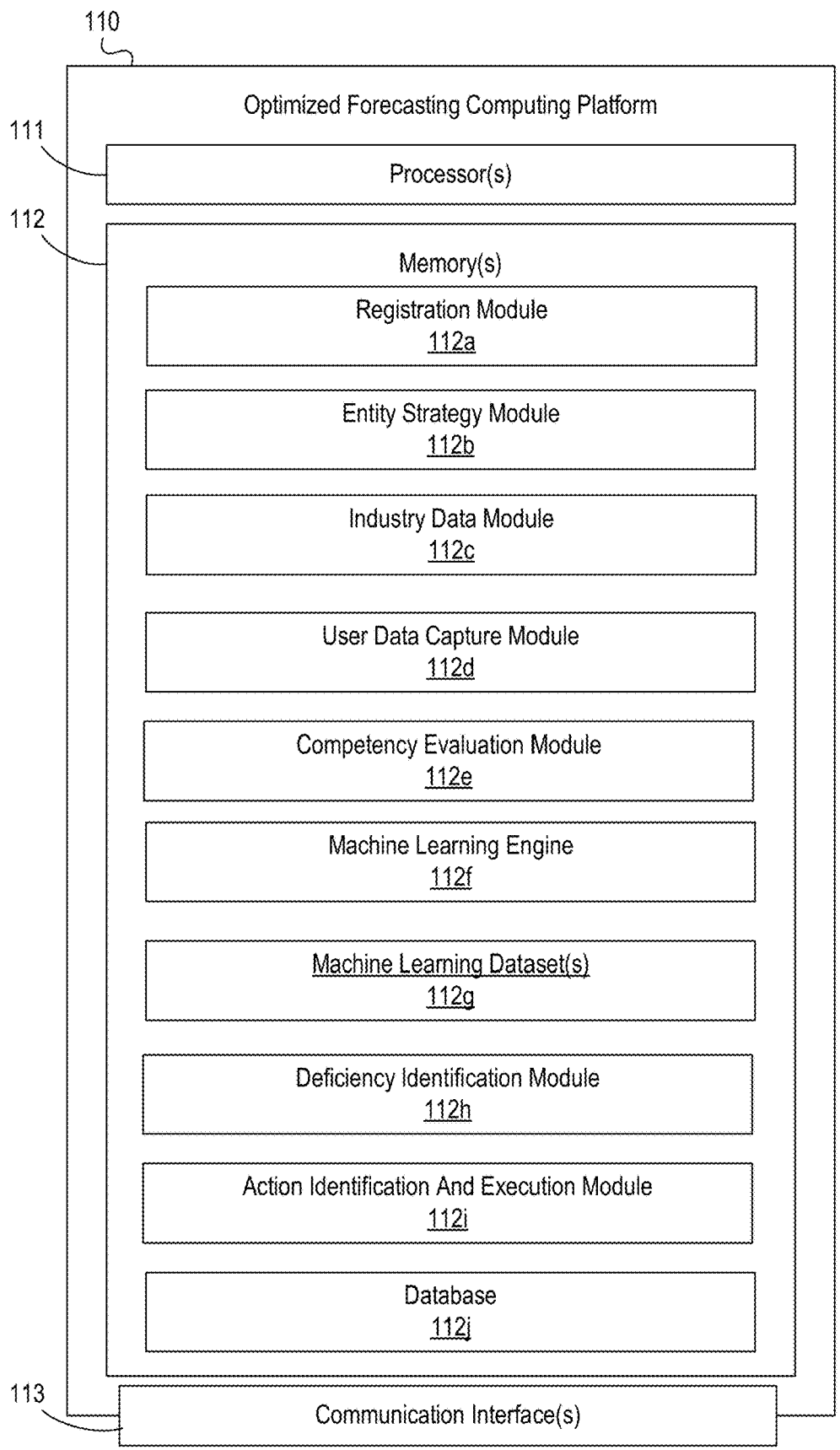

FIGS. 1A-1B depict an illustrative computing environment for implementing and using optimized forecasting in accordance with one or more aspects described herein. Referring to FIG. 1A, computing environment 100 may include one or more computing devices and/or other computing systems. For example, computing environment 100 may include optimized forecasting computing platform 110, internal entity computing system 120, internal entity computing system 125, a first local user computing device 150, a second local user computing device 155, a first remote user computing device 170, a second remote user computing device 175, a first external entity computing system 140 and a second external entity computing system 145. Although two internal entity computing systems 120, 125, two local user computing devices 150, 155, two remote user computing device 170, 175 and two external entity computing systems are shown, more or fewer devices or systems may be used without departing from the invention.

Optimized forecasting computing platform 110 may be configured to provide intelligent, dynamic, optimized forecasting functions. For instance, optimized forecasting computing platform 110 may receive (e.g., from internal entity computing system 120, internal entity computing system 125, or the like) enterprise strategy data from one or more enterprise business units within an enterprise organization. The enterprise strategy data may include goals for the business unit, upcoming projects of the business unit, and the like. In some examples, the enterprise strategy data may include identification of resources needed to meet the goals or complete the projects. Additionally or alternatively, machine learning may be used to identify resources needed based on the enterprise strategy information provided (e.g., type of project, timing of project, parameters of project, and the like).

In some examples, the optimized forecasting computing platform 110 may receive industry data from one or more external sources (e.g., external entity computing system 140, external entity computing system 145, or the like). This data may include trends in a particular industry and may be analyzed with the enterprise strategy data (e.g., using machine learning) to identify upcoming resource needs associated with a business unit, project, or the like.

Optimized forecasting computing platform 110 may further receive user performance data from one or more user computing devices, such as local user computing device 150, local user computing device 155, and the like. Additionally or alternatively, user performance data may be received from remote user computing device 170, remote user computing device 175, or the like. In some examples, optimized forecasting computing platform 110 may transmit an instruction, signal or command to one or more user computing devices to capture user performance data. In some examples, the user performance data may include keystroke data captured by one or more sensors in the user computing device, other user input device data (e.g., mouse input), documents or work product generated by the user, and the like. In some arrangements, the user performance data may be captured and received in real-time or near real-time. In some arrangements, user performance data may be captured and/or analyzed continuously.

The user performance data may be received and, in some examples, an objective competency rating of each user may be generated. For instance, keystroke data may be analyzed to identify a number of errors made by a user or defects identified when programming in a particular programming language. In another example, a document or work product (e.g., system architecture) may be analyzed or compared to other documents or work product to identify errors made by a user in generating the document or work product, review comments provided by a reviewer, and the like.

In some examples, based on the identified need and determined user competency, a deficiency or gap between the identified need and the identified competency may be determined. For instance, a need may include a project requiring ten programmers having at least a minimum level of competency in a particular programming language. The competency analysis of user performance data may indicate that only three users have a sufficient competency rating. Accordingly, seven more users are needed.

Based on the identified deficiency or gap, one or more actions may be identified and/or executed to remedy the deficiency or close the gap. For instance, a recommendation to hire additional users may be generated and transmitted to one or users or user devices. In another example, training in the particular programming language may be recommended and one or more training programs may be transmitted to user devices for execution.

Internal Entity computing system 120 and internal entity computing system 125 may be computing devices associated with the entity or enterprise organization implementing the optimized forecasting computing platform 110. In some examples, internal entity computing system 120 and/or internal entity computing system 125 may include systems associated with various business units within the enterprise organization and may include or store project descriptions, needs analyses, business unit goals, and the like. This data may be analyzed to identify or forecast needs associated with one or more business units.

External entity computing system 140, external entity computing system 145, and the like may be computing systems or devices associated with an entity external to the enterprise organization. For instance, external entity computing system 140 and/or external entity computing system 145 may include or store industry data identifying popular programming languages, applications, and the like. In some examples, the industry data may include projected needs or programming languages that will be heavily used in a future time period (e.g., next 3 months, next 6 months, next year, or the like).

Local user computing device 150, local user computing device 155, and the like, may be computing devices associated with or used by one or more employees of the enterprise organization to perform various job functions.

The computing devices 150, 155 may include user input devices and may include one or more sensors to capture user input data (e.g., keystroke data, mouse data, or the like) that may be analyzed by optimized forecasting computing platform 110 to determine a competency level of each user.

The remote user computing device 170 and remote user computing device 175 may be used to communicate with, for example, one or more systems, computing platforms, devices, or the like. In some examples, remote user computing device 170 and/or remote user computing device 175 may be devices associated with a user but not owned by the enterprise organization. In some examples, and with permission of the user, a user may perform one or more job functions using remote user computing device 170 and/or remote user computing device 175 and user performance data may be received by the optimized forecasting computing platform 110 for analysis.

Computing environment 100 also may include one or more computing platforms. For example, and as noted above, computing environment 100 may include optimized forecasting computing platform 110. As illustrated in greater detail below, optimized forecasting computing platform 110 may include one or more computing devices configured to perform one or more of the functions described herein. For example, optimized forecasting computing platform 110 may include one or more computers (e.g., laptop computers, desktop computers, servers, server blades, or the like).

As mentioned above, computing environment 100 also may include one or more networks, which may interconnect one or more of optimized forecasting computing platform 110, internal entity computing system 120, internal entity computing system 125, external entity computing system 140, external entity computing system 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, optimized forecasting computing platform 110, internal entity computing system 120, internal entity computing system 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect optimized forecasting computing platform 110, internal entity computing system 1 120, internal entity computing system 2 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., optimized forecasting computing platform 110, internal entity computing system 1 120, internal entity computing system 2 125, local user computing device 150, local user computing device 155) with one or more networks and/or computing devices that are not associated with the organization. For example, external entity computing system 140, external entity computing system 145, remote user computing device 170, remote user computing device 175, might not be associated with an organization that operates private network 190 (e.g., because external entity computing system 140, external entity computing system 145, remote user computing device 170, remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 140, external entity computing system 145, remote user computing device 170, remote user computing device 175, to private network 190 and/or one or more computing devices connected thereto (e.g., optimized forecasting computing platform 110, internal entity computing system 120, internal entity computing system 125, local user computing device 150, local user computing device 155).

Referring to FIG. 1B, optimized forecasting computing platform 110 may include one or more processors 111, memory 112, and communication interface 113. A data bus may interconnect processor(s) 111, memory 112, and communication interface 113. Communication interface 113 may be a network interface configured to support communication between optimized forecasting computing platform 110 and one or more networks (e.g., private network 190, public network 195, or the like). Memory 112 may include one or more program modules having instructions that when executed by processor(s) 111 cause optimized forecasting computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of optimized forecasting computing platform 110 and/or by different computing devices that may form and/or otherwise make up optimized forecasting computing platform 110.

For example, memory 112 may have, store and/or include a registration module 112a. Registration module 112a may store instructions and/or data that may cause or enable the optimized forecasting computing platform 110 to receive data related to one or more users and/or user devices, or the like. In some examples, registration module 112a may receive data such as user name, employee number or other unique identifier, unique identifier associated with one or more user devices associated with the user, and the like. In some arrangements, registration module 112a may receive information associated with one or more job functions of each user, business unit associated with each user, programming languages of each user, job skills associated with each user, educational background associated with each user, work experience associated with each user, and the like. This information may be used to evaluate competency of a user, determine whether a user meets an identified need for a project or business unit, or the like.

Optimized forecasting computing platform 110 may further have, store, and/or include an entity strategy module 112b. Entity strategy module 112b may store instructions and/or data that may cause or enable optimized forecasting computing platform 110 to receive, from one or more systems or devices, such as internal entity computing system 120, internal entity computing system 125, or the like, enterprise strategy data including one or more projects, business unit goals, expected resource needs, or the like. In some examples, this information may be automatically transmitted to the optimized forecasting computing platform 110 upon input into the internal entity computing system 120, internal entity computing system 125, or the like.

Optimized forecasting computing platform 110 may further have, store and/or include industry data module 112c. Industry data module 112c may store instructions and/or data that may cause or enable the optimized forecasting computing platform 110 to receive and store data associated with industry trends, expected changes in industry practices, and the like. For instance, programming languages, applications, and the like, that are currently in use, are newly identified in the industry, are expected to be widely used, or the like, may be identified via one or more external computing systems, such as external entity computing system 140, external entity computing system 145, and the like. The data may then be transmitted from the external entity computing system to the optimized forecasting computing platform 110.

Optimized forecasting computing platform 110 may further have, store and/or include user data capture module 112d. User data capture module 112d may store instructions and/or data that may cause or enable the optimized forecasting computing platform 110 to transmit a request for user data to one or more user devices, such as local user computing device 150, local user computing device 155, remote user computing device 170, remote user computing device 175, and the like. In some examples, transmitting the request for user data may include transmitting an instruction or command causing one or more sensors or input capture devices of the user device to initiate or activate in order to capture user input. For instance, keystroke data, mouse input data, document data, and the like, may be captured.

Optimized forecasting computing platform 110 may further have, store and/or include competency evaluation module 112e. Competency evaluation module 112e may store instructions and/or data that may cause or enable the optimized forecasting computing platform 110 to analyze the received user data from the user data capture module 112d to determine one or more competencies for each user. For instance, user data may be analyzed to determine a competency associated with programming in a particular programming language. In another example, user data may be analyzed to determine a competency of a user associated with generating a particular type of document. Various other job performance competencies may be determined without departing from the invention.

In some examples, machine learning may be used to determine the competency. Accordingly, optimized forecasting computing platform 110 may further have, store and/or include a machine learning engine 112f and machine learning datasets 112g. Machine learning engine 112f and machine learning datasets 112g may store instructions and/or data that may cause or enable optimized forecasting computing platform 110 to evaluate user data and determine one or more competencies from the user data. In some examples, information provided at registration may also be used to determine competency. For instance, educational background, work experience, and the like, may be used. Machin learning datasets 112g may be generated based on analyzed data (e.g., data from previously received data, and the like), raw data, and/or received from one or more outside sources.

The machine learning engine 112f may receive user performance data, user input data, and the like and, using one or more machine learning algorithms, may generate one or more machine learning datasets 112g. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112f may analyze data to identify patterns of activity, sequences of activity, and the like, to generate one or more machine learning datasets 112g.

In some examples, the machine learning datasets 112g may include machine learning data linking particular keystroke data, error or defect data, mouse data, or the like, to competency associated with a particular job skill, job function, job resource, or the like. Accordingly, as user data is received (e.g., by the user data capture module 112d) the machine learning datasets may be used to analyze the data and determine a competency output.

Optimized forecasting computing platform 110 may further have, store and/or include deficiency identification module 112h. Deficiency identification module 112h may store instructions and/or data that may cause or enable optimized forecasting computing platform 110 to identify any gaps or deficiencies between the desired or designated needs for a project, business goal, or the like (e.g., via entity strategy module 112b) and the identified or determined competencies of the users (e.g., from competency evaluation module 112e). In some examples, machine learning (e.g., one or more machine learning datasets 112f) may be used to identify deficiencies based on sequences or patterns identified in the entity strategy data and user competency data. In some examples, deficiencies may include an insufficient number of users to meet designated needs, an insufficient number of people with a desired skill set (e.g., proficiency in a particular programming language, or the like), inexperience with a particular skill set (e.g., a newly identified programming language to be used and requires training for users), or the like.

Optimized forecasting computing platform 110 may further have, store and/or include action identification and execution module 112i. Action identification and execution module 112i may identify or generate one or more actions to remedy the deficiencies identified by deficiency identification module 112h. For instance, action identification and execution module 112i may identify one or more remedial actions (e.g., hire additional users, provide training to users, generate recommendations to improve competencies, and the like) and may transmit the actions to one or more computing devices (e.g., local user computing device 150, local user computing device 155, or the like). Transmitting the actions may include transmitting instructions or commands that may cause the computing device to execute one or more actions (e.g., execute a training program, execute an instruction to post for additional users, or the like).

Optimized forecasting computing platform 110 may further have, store and/or include one or more databases 112j. Database 112j may store data including business unit projects and/or goals, competencies identified, deficiencies identified, actions identified, outcome of actions, and the like.

FIGS. 2A-2G depict one example illustrative event sequence for implementing and using optimized forecasting functions in accordance with one or more aspects described herein. The events shown in the illustrative event sequence are merely one example sequence and additional events may be added, or events may be omitted, without departing from the invention.

At step 201, registration data may be received. For instance, users, such as employees of an enterprise organization, may register with optimized forecasting computing platform 110. Registration data may include name, contact information, employee number or other unique identifier, devices associated with the user (e.g., unique identifier associated with each device associated with the user), background information such as work history, job skills, educational background, and the like. Various other information may be provided during registration without departing from the invention.

At step 202, a registration entry may be generated. For instance, a database may be modified to include an entry associated with the registration request and registration data. The entry may include a plurality of data elements associated with the user, user data provided, device data provided, and the like.

At step 203, a request for enterprise strategy data may be generated. For instance, optimized forecasting computing platform 110 may generate a request for business goals, projects, and the like, for one or more business units operating within the enterprise organization. The strategy data may include data for a predetermined time period, such as an upcoming 3 or 6 month period, one year, or the like.

At step 204, a connection may be established between the optimized forecasting computing platform 110 and internal entity computing system 120. For instance, a first wireless connection may be established between the optimized forecasting computing platform 110 and internal entity computing system 120. Upon establishing the first wireless connection, a communication session may be initiated between optimized forecasting computing platform 110 and internal entity computing system 120.

At step 205, the generated request for enterprise strategy data may be transmitted from the optimized forecasting computing platform 110 to internal entity computing system 120. For instance, the generated request for strategy data may be transmitted during the communication session initiated upon establishing the first wireless connection.

Figure 2A:
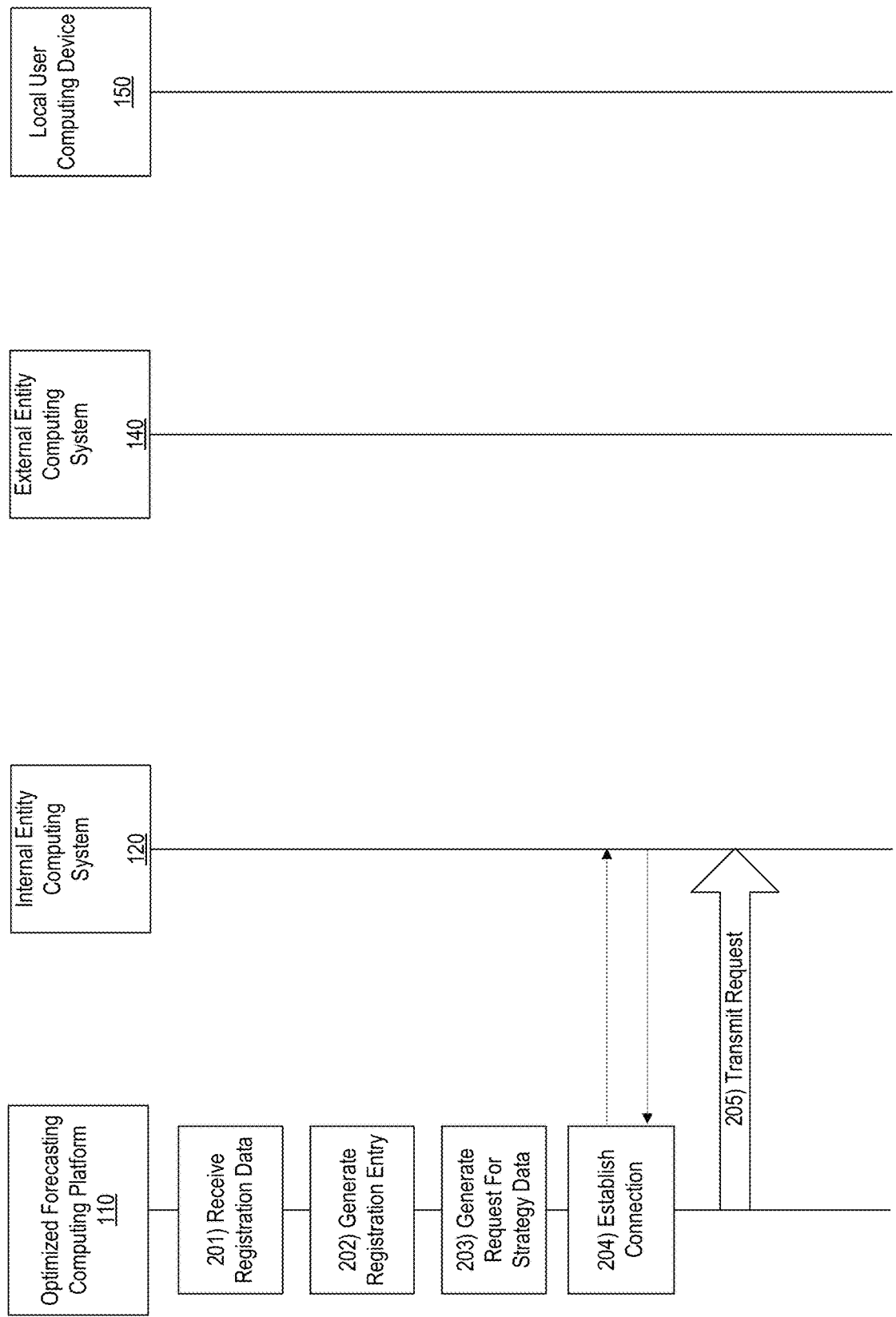
FIGS. 2A-2G depict an illustrative event sequence for implementing optimized forecasting in accordance with one or more aspects described herein.
Figure 2B:
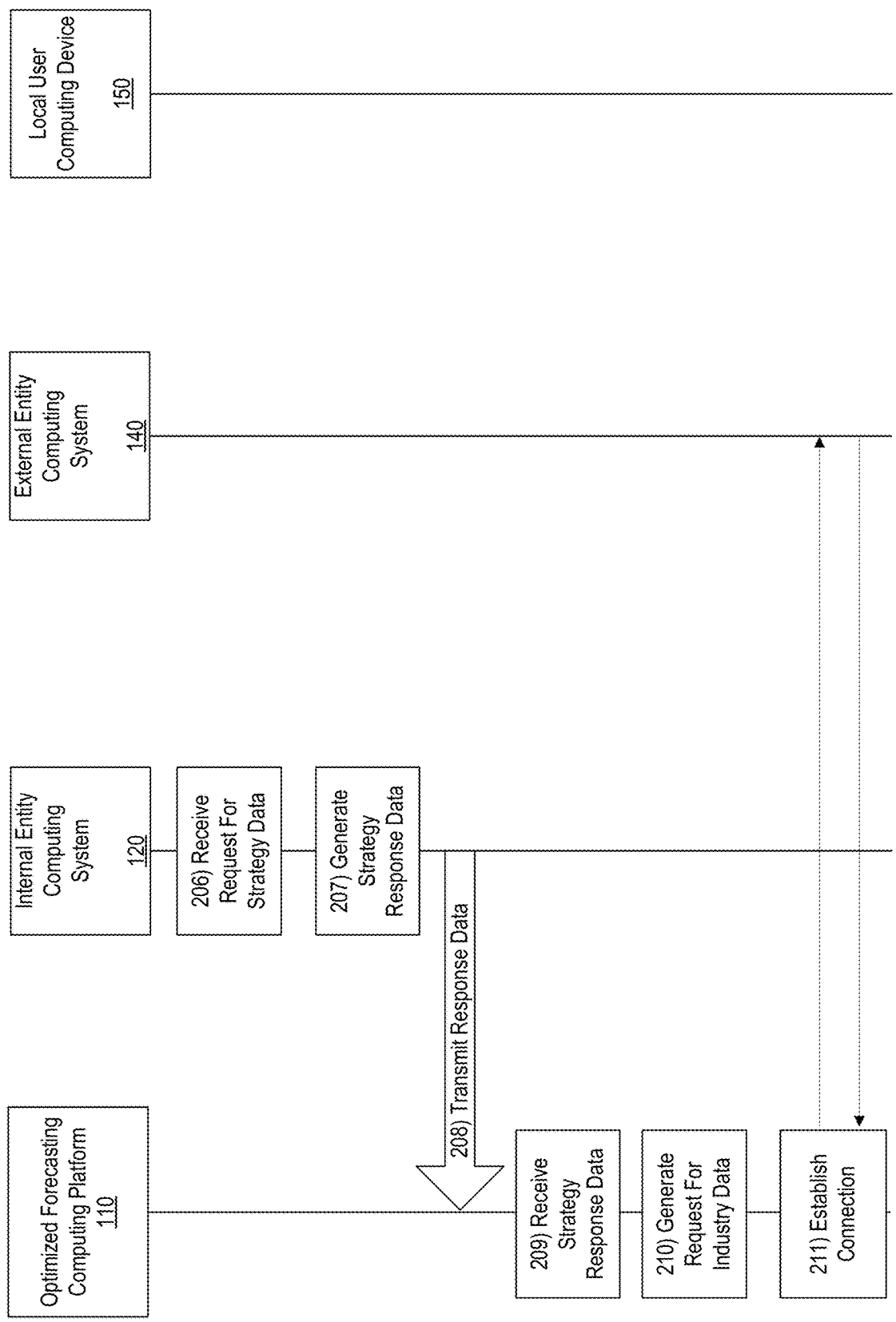

With reference to FIG. 2B, at step 206, the generated request for strategy data may be received by internal entity computing system 120. At step 207, the request may be executed and strategy response data may be generated. For instance, the request for strategy data may include commands (e.g., generated by entity strategy module 112b) to capture particular information, such as a business unit, type of project, parameters or goal or project, time period of goal or project, job skills associated with goal or project, particular programming languages for goal or project, and the like. Upon receiving the request for strategy data, internal entity computing system 120 may execute the commands to extract the requested data. The extracted data may then be used to generate strategy response data.

At step 208, the strategy response data may be transmitted from the internal entity computing system 120 to the optimized forecasting computing platform 110. In some examples, the strategy response data may be transmitted during the communication session initiated upon establishing the first wireless connection. In other examples, an additional wireless connection and communication session may be initiated and established.

At step 209, the strategy response data may be received by optimized forecasting computing platform 110 and stored (e.g., in entity strategy module 112b, database 112j, or the like).

At step 210, a request for industry data may be generated. For instance, industry data module 112c may generate a request for industry data including trends in job skills, applications, programming languages, and the like.

At step 211, a connection may be established between the optimized forecasting computing platform 110 and external entity computing system 140. For instance, a second wireless connection may be established between the optimized forecasting computing platform 110 and external entity computing system 140. Upon establishing the second wireless connection, a communication session may be initiated between optimized forecasting computing platform 110 and external entity computing system 140.

Figure 2C:
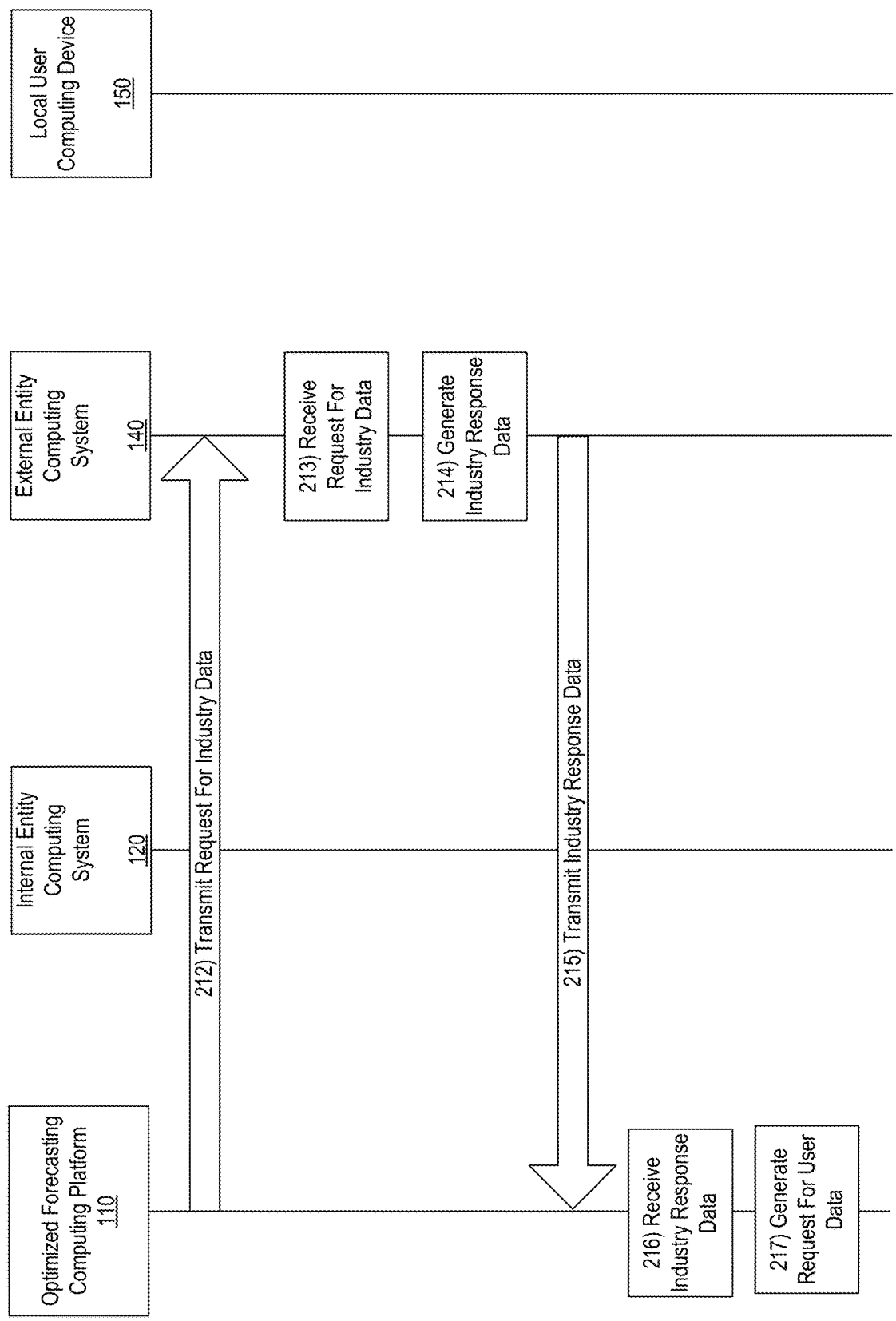

With reference to FIG. 2C, at step 212, the request for industry data may be transmitted from the optimized forecasting computing platform 110 to external entity computing system 140. For instance, the request for industry data may be transmitted during the communication session initiated upon establishing the second wireless connection.

At step 213, the request for industry data may be received by external entity computing system 140. At step 214, the request may be executed and industry response data may be generated. For instance, the request for industry data may include commands (e.g., generated by industry data module 112c) to capture particular information, such as trends in job skills, in demand job skills, trends or in demand programming languages, trends or in demand application experience, and the like. Upon receiving the request for industry data, external entity computing system 140 may execute the commands to extract the requested data. The extracted data may then be used to generate industry response data.

At step 215, the industry response data may be transmitted from external entity computing system 140 to optimized forecasting computing platform 110. In some examples, the industry response data may be transmitted during the communication session initiated upon establishing the second wireless connection. In other examples, another wireless connection and communication session may be established and initiated.

At step 216, the industry response data may be received by optimized forecasting computing platform 110 and stored (e.g., in industry data module 112c, database 112j, or the like).

At step 217, a request for user data may be generated. For instance, optimized forecasting computing platform 110 (e.g., user data capture module 112d) may generate a request to capture user data. In some examples, the request may include identification of a user, device, type of data to capture, sensors to activate, and the like.

Figure 2D:
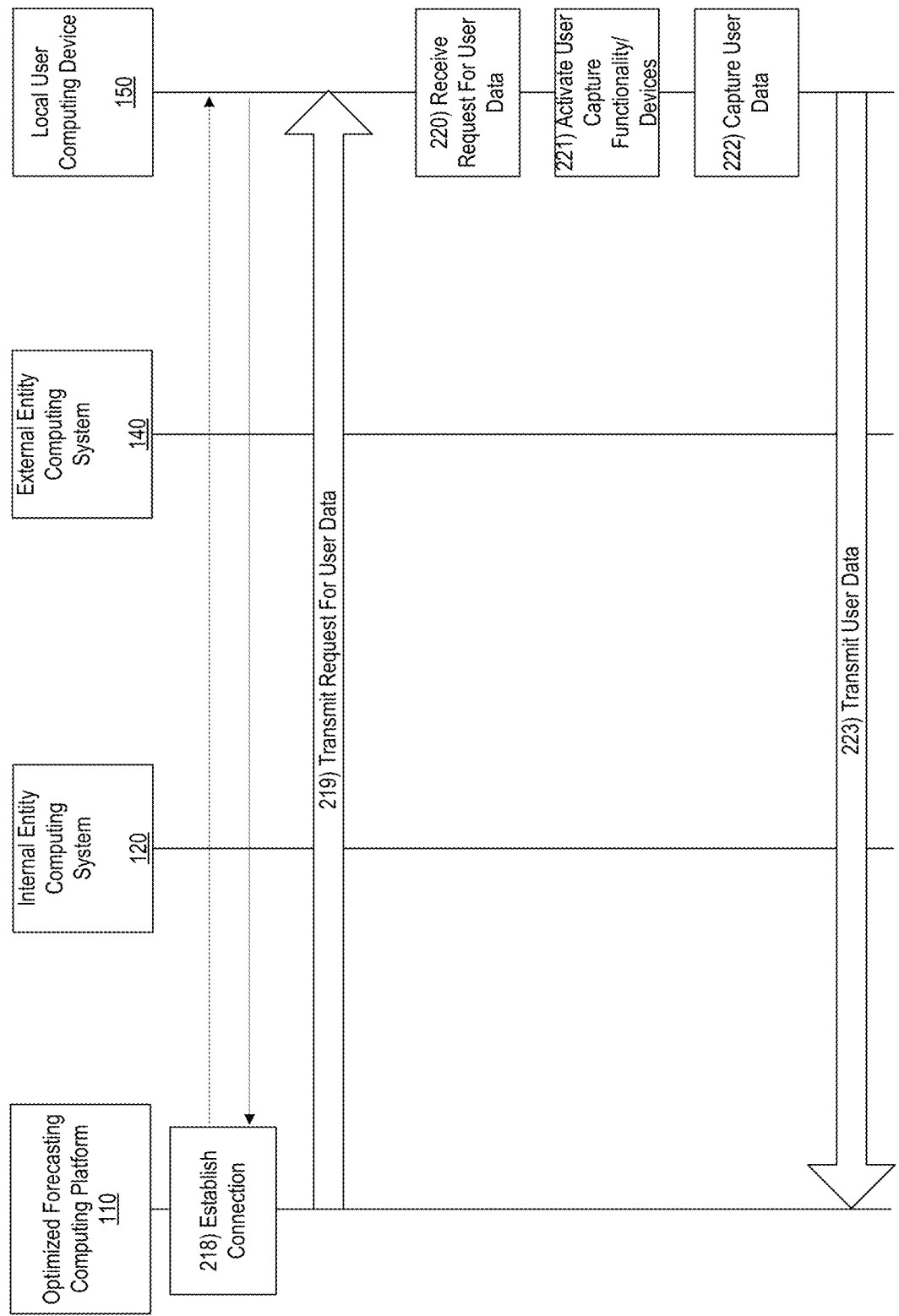

With reference to FIG. 2D, at step 218, a connection may be established between the optimized forecasting computing platform 110 and local user computing device 150. Although a connection to one local user device 150 is shown, optimized forecasting computing platform 110 may connect to and request data from a plurality of user computing devices simultaneously or near-simultaneously.

A third wireless connection may be established between the optimized forecasting computing platform 110 and local user computing device 150. Upon establishing the third wireless connection, a communication session may be initiated between optimized forecasting computing platform 110 and local user computing device 150.

At step 219, the generated request for user data may be transmitted from the optimized forecasting computing platform 110 to local user computing device 150. For instance, the request for user data may be transmitted during the communication session initiated upon establishing the third wireless connection.

At step 220, the request for user data may be received by local user computing device 150. At step 221, the generated request for user data may be executed by local user computing device 150. For instance, executing the generating request for user data may include executing one or more instructions or commands in the request for user data causing activation of user capture functionality and/or devices (e.g., one or more sensors) in local user computing device 150. For instance, keystroke capture functionality, mouse input capture functionality, and the like may be activated or enabled based on executing the request for user data.

At step 222, user data may be captured. In some examples, user data may be captured for a particular task, such as generating specific code using a particular programming language, generating a particular document, or the like. Additionally or alternatively, user data may be captured over a predefined time period (e.g., one work day, eight hours, one work week, or the like). User data may be captured in real-time or near real-time and/or on a continuous basis.

At step 223, the captured user data may be transmitted from the local user computing device 150 to optimized forecasting computing platform 110. For instance, the user data may be transmitted during the communication session initiated upon establishing the third wireless connection. Alternatively, another wireless connection and communication session may be established and initiated.

Figure 2E:
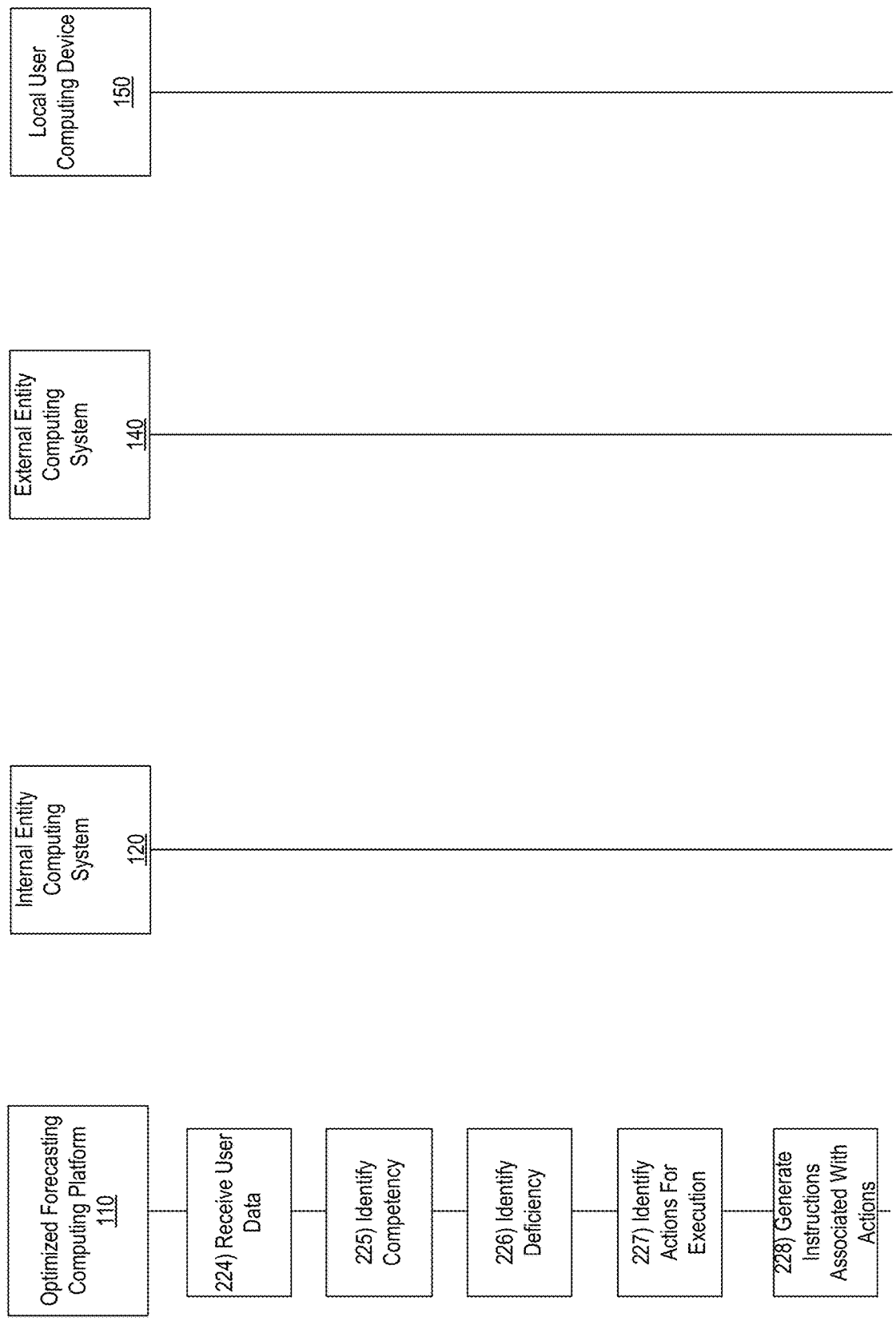

With reference to FIG. 2E, at step 224, the user data may be received by optimized forecasting computing platform 110 and stored (e.g., in user data capture module 112*d*, database 112*j*, or the like).

At step 225, the user data may be analyzed (e.g., using machine learning) to identify one or more competencies or competency levels for the user. For instance, the user data may be analyzed to determine a number of errors committed by the user or defects in generating code in a particular programming language, a number of errors or review comments provided in preparing a particular type of document, or the like. This information may be used to evaluate job performance of the user and identify or determine one or more competencies or competency levels (e.g., for a particular task, job skill, or the like).

In some examples, the user data may be compared to baseline user data (e.g., baseline keystroke, mouse input, or the like) that was previously collected and stored. Accordingly, by comparing the newly received data to baseline data, differences in user competency over time may be identified.

At step 226, the competency data, entity strategy data and industry data may be further analyzed to identify any deficiencies or gaps between the competency or job performance of the user and entity needs or requirements for a particular goal, project, or the like. In some examples, machine learning may be used to identify one or more deficiencies. For instance, a shortage of workers overall in order to complete a project on time may be identified. In another example, industry trends may indicate an increase in use of a particular programming language. The user data may indicate a shortage of users having at least a minimum threshold competency in that programming language. Machine learning may be used to identify patterns or sequences in data to identify deficiencies. Various other deficiencies or gaps may be identified without departing from the invention.

At step 227, one or more actions for execution may be identified. For instance, one or more actions to remedy an identified deficiency may be identified. For example, training modules may be identified and transmitted to users for execution. In another example, a particular number of users to hire to meet an identified need may be identified. In some examples, machine learning may be used to identify the one or more actions. Various other actions may be identified without departing from the invention.

At step 228, instructions or commands and/or notifications associated with the identified actions may be generated. For instance, instructions or commands causing one or more actions to automatically execute on, for instance, local user computing device 150, may be generated. Further, one or more notifications including identified actions, recommendations, and the like, may be generated.

Figure 2F:
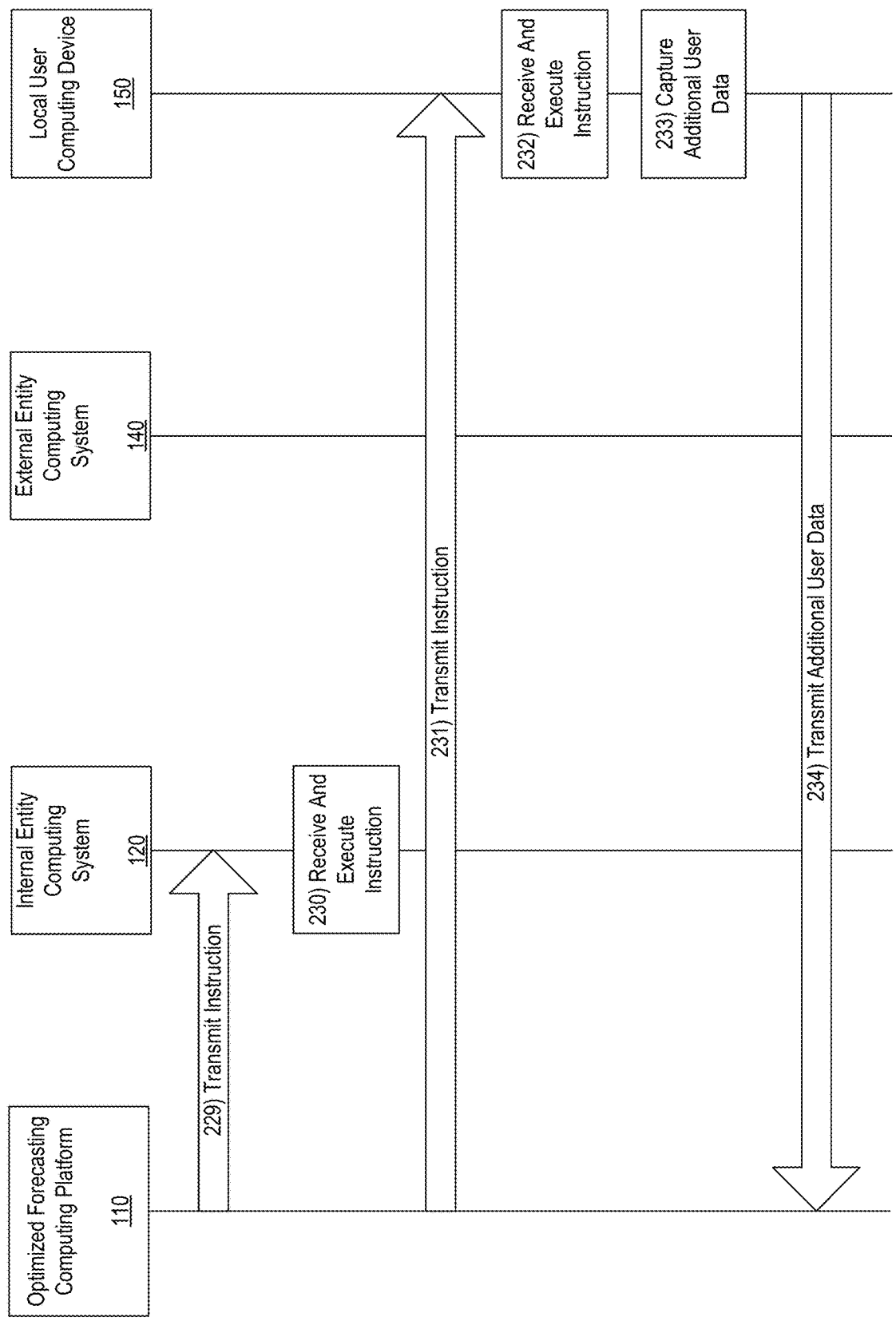

With reference to FIG. 2F, at step 229, one or more of the generated instructions or notifications may be transmitted to internal entity computing system 120. For instance, the instruction to execute one or more actions, recommendations for executing one or more actions, and the like, may be transmitted to the internal entity computing system 120. In some examples, the actions, recommendations, notifications, and the like, may be integrated into project data, goal data, and the like, for a particular business unit.

At step 230, the instructions may be received and executed by the internal entity computing system 120.

At step 231, one or more of the generated instructions or notifications may be transmitted to local user computing device 150. For instance, instructions associated with actions to improve competency of a user (e.g., training, interactive educational materials, recommendations, or the like) may be transmitted to the local user computing device 150.

At step 232, the instruction may be received and executed by the local user computing device 150.

At step 233, additional user data may be captured. For instance, after receiving recommended actions identified by the optimized forecasting computing platform 110 to address any identified deficiencies, additional user data (e.g., keystroke data, work product data, and the like) may be captured. At step 234, the additional user data may be transmitted from the local user computing device 150 to the optimized forecasting computing platform 110.

Figure 2G:
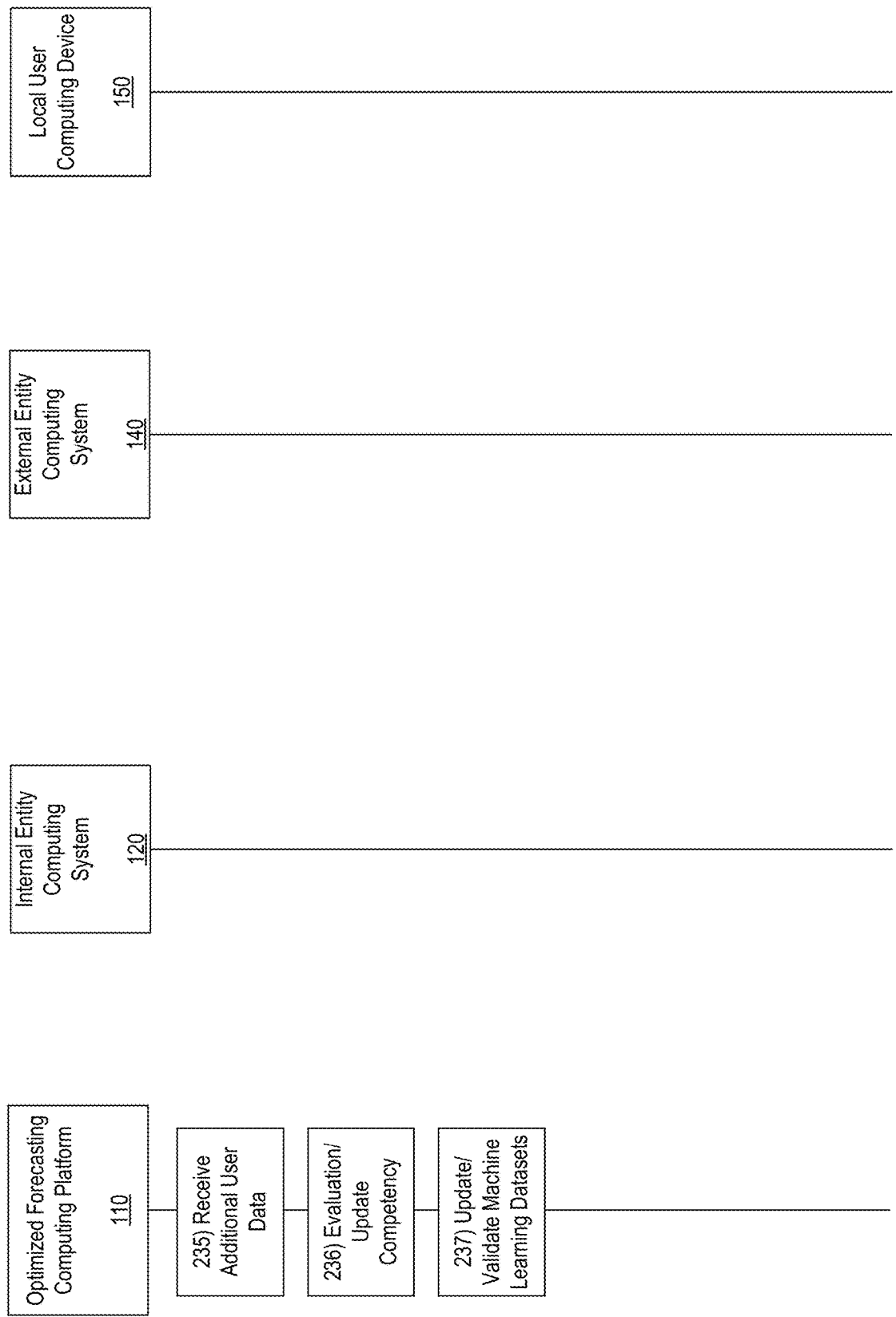

With reference to FIG. 2G, at step 235, the additional user data may be received by the optimized forecasting computing platform 110.

At step 236, the user data may be analyzed (e.g., using machine learning) to further evaluate and/or update identified competencies or competency levels of the user. That is, after actions are identified, the additional captured user data may be analyzed to determine whether there has been a change in competency for a user.

At step 237, the additional user data may also be used to update and/or validate one or more machine learning datasets. For instance, the system may continuously update to improve machine learning outputs related to identified deficiencies, identified actions to remove deficiencies, or the like.

Figure 3:
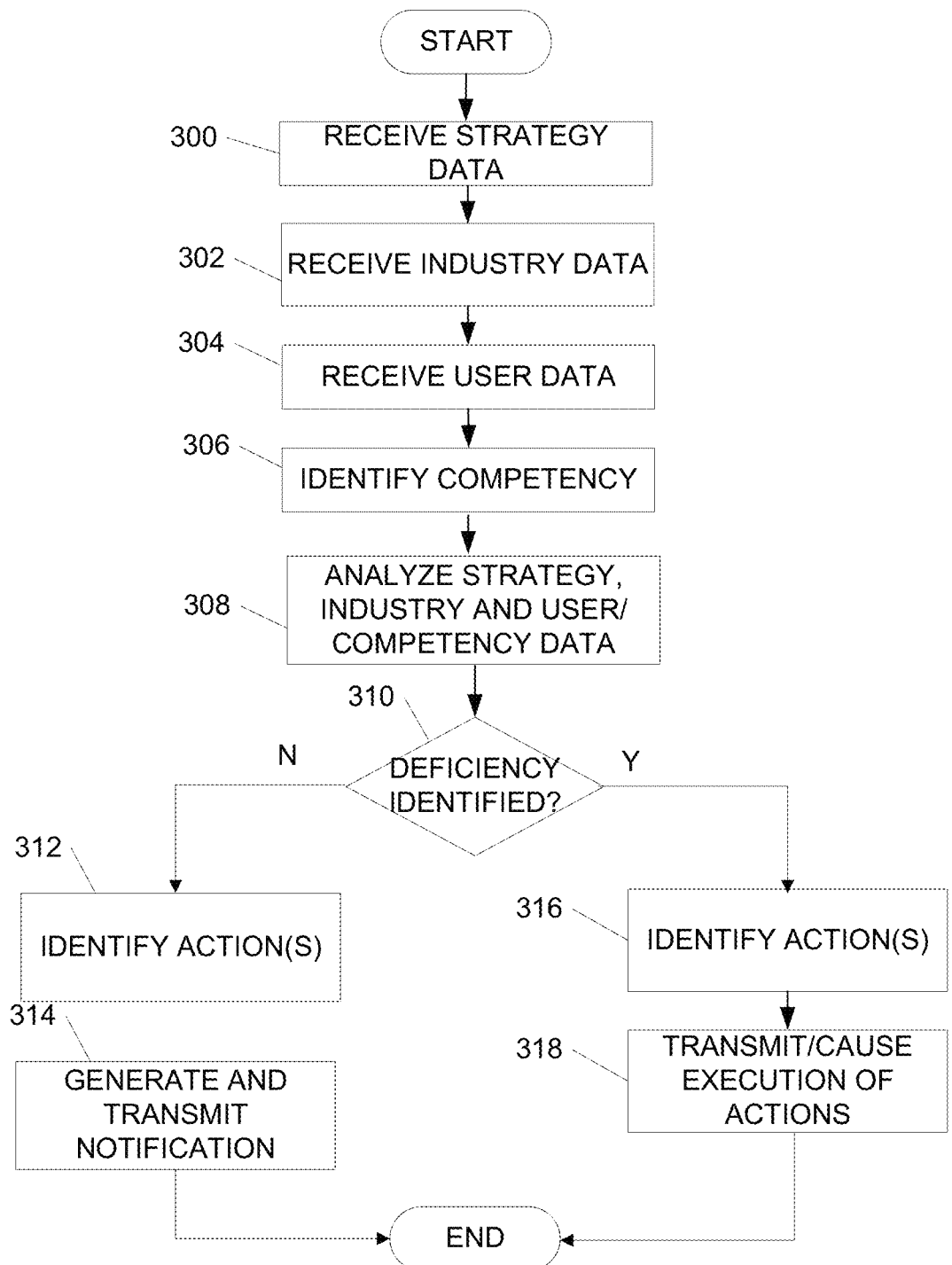
FIG. 3 depicts an illustrative method for implementing and using optimized forecasting according to one or more aspects described herein.

FIG. 3 is a flow chart illustrating one example method of implementing optimized forecasting functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 300, entity or enterprise strategy data may be received. In some examples, entity or enterprise strategy data may include data from a plurality of business or enterprise units within the enterprise organization. The strategy data may include business goals of each unit, development goals of users within each unit, expectations for each unit, upcoming or expected projects of each business unit, and the like. In some examples, the strategy data may include identified resources needed for an enterprise strategy. Additionally or alternatively, machine learning may be used to identified resources needed for the identified enterprise strategy.

At step 302, industry data may be received. For instance, industry data indicating or identifying trends within an industry may be received from an external source, such as external entity computing system 140. In some examples, the industry data may be publicly available data. The industry data may include trends in job skills, identified or anticipated shortages of skills, educational trends, and the like. In some examples, industry data may include data associated with use of various programming languages, applications in use, and the like.

At step 304, user performance data may be received. For instance, an instruction to capture enterprise user data from a plurality of enterprise user computing devices may be generated and transmitted to the plurality of enterprise user computing devices. In some examples, the instruction may include an instruction to activate or enable one or more data capture devise. In response to the instruction, user performance data may be received by the optimized forecasting computing platform 110. The user performance data may include user input data received via one or more computing devices, systems, and the like. For instance, user input data may include user keystroke or other data as a user, for example, a software developer, writes software code. Additionally or alternatively, the user performance data may include one or more piece of work product, such as documents, or the like, that were prepared by the user during the course of the user's work. Further, user input data may include data captured from another input device, such as a mouse, microphone, stylus, or the like. In some arrangements, the user data may be captured in real-time or near real-time.

In some examples, receiving user performance data may include receiving data associated with a programming language, system, software, or the like, that the user is working with. For instance, the user performance data may include data related to a type of or particular programming language being used, and the like. This information may be used to evaluate proficiency or competency of the user.

At step 306, the user performance data may be analyzed to determine one or more competencies, performance parameters, or the like, associated with the user. In some examples, the user data may be analyzed in real-time or near real-time. Additionally or alternatively, analyzing the user performance data may be performed using machine learning. For instance, machine learning may be used to analyze user keystroke data to identify errors or defects in the code being written (e.g., by identifying patterns, sequences, and the like). In another example, machine learning may be used to analyze one or more documents prepared by the user to identify one or more errors within the document. In some examples, a machine learning engine having a plurality of machine learning datasets may be used to evaluate the data and identify any patterns, sequences, and the like. In some examples, the machine learning datasets may be updated and/or validated based on subsequent data received.

The analyzed user performance data may be used to identify one or more competencies or levels of competency or proficiency of a user, performance of a user, and the like. For instance, if a user makes fewer than a threshold number of errors or defects when programming in a particular language, that user may be identified as having a certain level of proficiency or competency associated with that programming language. In another example, if a user makes more than a threshold number of errors when generating a particular type of document or a document using a particular type of software, that user may be identified as having a particular level of proficiency or competency with respect to that software, preparation of that type of document, or the like.

At step 308, the strategy data, industry data, user data and user competencies may be analyzed to identify any deficiencies between identified needs or desired resources (e.g., for a project, to meet a goal, or the like) and the identified competencies and resources of the users. For instance, strategy data and industry data may be analyzed (e.g., using machine learning) to identify one or more resources or needs to meet a goal, complete a project on time, or the like, for one or more business units of the enterprise organization. The identified competencies of the users may be compared (e.g., using machine learning) to the identified needs or resources to determine whether any deficiencies exist between the two.

At step 310, a determination may be made, based on the analysis in step 308, of whether any deficiencies exist. If not, at step 312, one or more actions or recommendations may be identified. For instance, machine learning may be used to identify one or more actions, such as allocation of resources such as computing resources, staffing, and the like, to meet the strategy data (e.g., goals, projects, or the like) the business unit.

At step 314, a notification including the identified actions may be generated and transmitted to one or more computing devices, such as local user computing device 150, local user computing device 155, internal entity computing system 120, internal entity computing system 125, and the like.

If, at step 310, one or more deficiencies do exist, at step 316, one or more actions to remedy the deficiency may be identified. For instance, a number of users to increase, training modules for execution by one or more users, educational needs of one or more users, and the like, may be identified. In some examples, machine learning may be used to identified the actions.

At step 318, the identified actions may be transmitted to a computing device, such as local user computing device 150, for execution.

At step 310, the identified proficiencies of the users may be compared to the identified upcoming or current need to determine whether a gap exists. For instance, if x number of users are desired to complete a project and each user must have a particular level of proficiency, a gap may exist if the business unit does not have x users to meet the need or does not have x users with the identified level of proficiency.

If, at step 310, no gap is identified, one or more instructions and/or notifications may be generated identifying users having the desired level of proficiency, and the like. In some examples, machine learning may be used to identify users that should be assigned to the project (e.g., if the business unit has more than the desired number of workers, machine learning may be used to identify the particular workers having the highest proficiency, or the like, that should be assigned to the project).

If, at step 310, a gap is identified, one or more action items may be identified based on the identified gap. For instance, machine learning may be used to identify one or more action items to execute in order to fill the identified gap. In some examples, the action items may include identifying a number of users to hire to complete the project, identifying one or more training actions to execute for one or more current users to improve proficiency, and the like. In some examples, action items for each user evaluated in the business unit may be identified. Accordingly, a customized plan for each user to improve competency and/or proficiency may be generated.

At step 312, one or more instructions and/or notifications may be generated. In some examples, the notifications may include identification of users who can fill the gap, action items for each user, and the like. In some examples, the notifications may include links to one or more items that, when executed, may aid in improving proficiency of the user (e.g., training classes, training exercises, and the like). The generated instructions and/or notifications may be transmitted to one or more user computing devices, administrator computing devices, or the like. The outputs generated may then be used to staff projects, execute action items, and the like.

Figure 4:
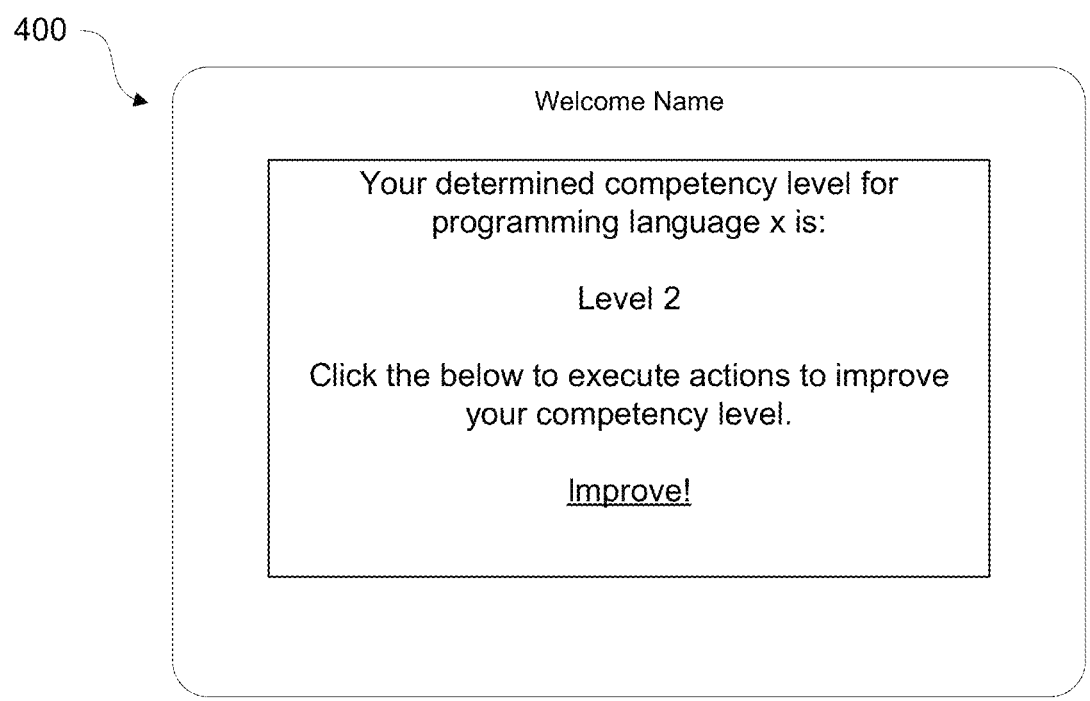
FIG. 4 illustrates one example interactive user interface that may be generated and/or displayed in accordance with one or more aspects described herein.

FIG. 4 illustrates one example notification that may be generated and transmitted to, for example, local user computing device 150. Interface 400 includes an identified competency level of the user (e.g., Level 2) based on, for example, user input data analyzing using, in some examples, machine learning. Further, the notification includes a link to execute one or more actions for improvement (e.g., to reduce or eliminate an identified deficiency). In some examples, the user may select the link and one or more actions, applications, or the like, may execute (e.g. based on the identified action). In other examples, the action may automatically execute (e.g., without user input selecting the link). Various other interfaces and arrangements may be used without departing from the invention.

Accordingly, arrangements described herein may permit objective identification of user proficiencies or competencies that may be used to evaluate work performance. In addition, the arrangements enable real-time evaluation of user performance and analysis of forecast needs and industry trends in order to identify any gaps or deficiencies between current worker proficiency or performance and needs for upcoming projects or other work functions. In some examples, machine learning may be used to evaluate user performance, identify gaps, identify action items to close or eliminate identified gaps, and the like.

For instance, arrangements discussed herein provide a holistic approach to allocating resources for enterprise business units and the enterprise organization as a whole. They enable the enterprise to efficiently build and develop talent, manage resources, and the like. Processes can be executed to manage resources for upcoming projects, goals, and the like, as well as long term strategic plans (e.g., 5 years, 10 years, or the like).

As discussed herein, the system enables continuous determination and tracking of user performance competency. The user data may be captured in real-time or near real-time in order to accurately evaluate competency and provide an object measure of competency at any point in time. Further, users may be evaluated on a granular level. For instance, competency for overall job performance may be determined, as well as competency for a particular job skill (e.g., writing code in a particular programming language, generating a particular type of work product, and the like). The system may also enable tracking of competency to understand trends in user competencies.

Further, the system enables customized evaluation by receiving strategy data from a plurality of enterprise business units and evaluating the strategy data for each of the business units with the competency data. Further, the system may provide analysis of user competency for users outside of a particular business unit but for potential use within the business unit. For instance, users in business unit A may have competencies that may be useful for a project identified for business unit B. By evaluating a plurality of business units and evaluating the enterprise holistically, these opportunities may be efficiently identified.

Accordingly, by continuously capturing and evaluating user data, regardless of the business unit for which the user is working, competency of the user may be continuously tracked to understand their overall performance. Further, by continuously tracking user performance, the system may evaluate technical performance as well as overall performance. For instance, time spent on a given project, trends in number of errors identified, and the like, may be used to evaluate non-technical aspects of the user's performance.

As discussed above, user data may include keystroke data, mouse input data, and the like. In some examples, this data may be compared to baseline data to identify trends over time. For instance, baseline data for each user (e.g., typing patterns, mouse input patterns, and the like) may be captured and stored. Newly received user data may then be compared to the baseline data to detect changes in speed, patterns, or the like. This data may then be used to evaluate competency.

In some examples, user data may be anonymized for analysis in some circumstances (e.g., for comparison to other users). Accordingly, the user data may be analyzed as the user for performance evaluation and/or anonymized for further evaluation.

As discussed herein, industry data may include trends in one or more industries. For instance, a number of downloads for a particular programming language, versions of a language, or the like, may indicate an in-demand or upcoming in-demand job skill. The industry may track this data and the system may receive that data to understand upcoming needs. This may aid in identifying both short-term and long-term needs. For instance, the industry data may indicate that users having a minimum competency in programming in a particular language may be needed for future needs and users with those skills should be hired or developed.

As discussed herein, various deficiencies between resources needed and resources available may be identified. The deficiencies may be for the enterprise as a whole (e.g., an enterprise will need 100 developers but currently has 75), for an individual enterprise business unit (e.g., a project will need developers in programming language x and does not have one), for a particular user (e.g., other users have a higher competency in this particular programming language you should improve your competency), and the like.

Accordingly, arrangements discussed herein may provide objective performance data for users that may be used to allocate resources for an enterprise or enterprise business unit. In addition, the arrangements described herein may aid in identifying career goals for a particular user. For instance, machine learning may be used to identify next steps, new skills, and the like, that a particular developer should develop in order to advance down a particular career path, improve performance, and the like.

Figure 5:
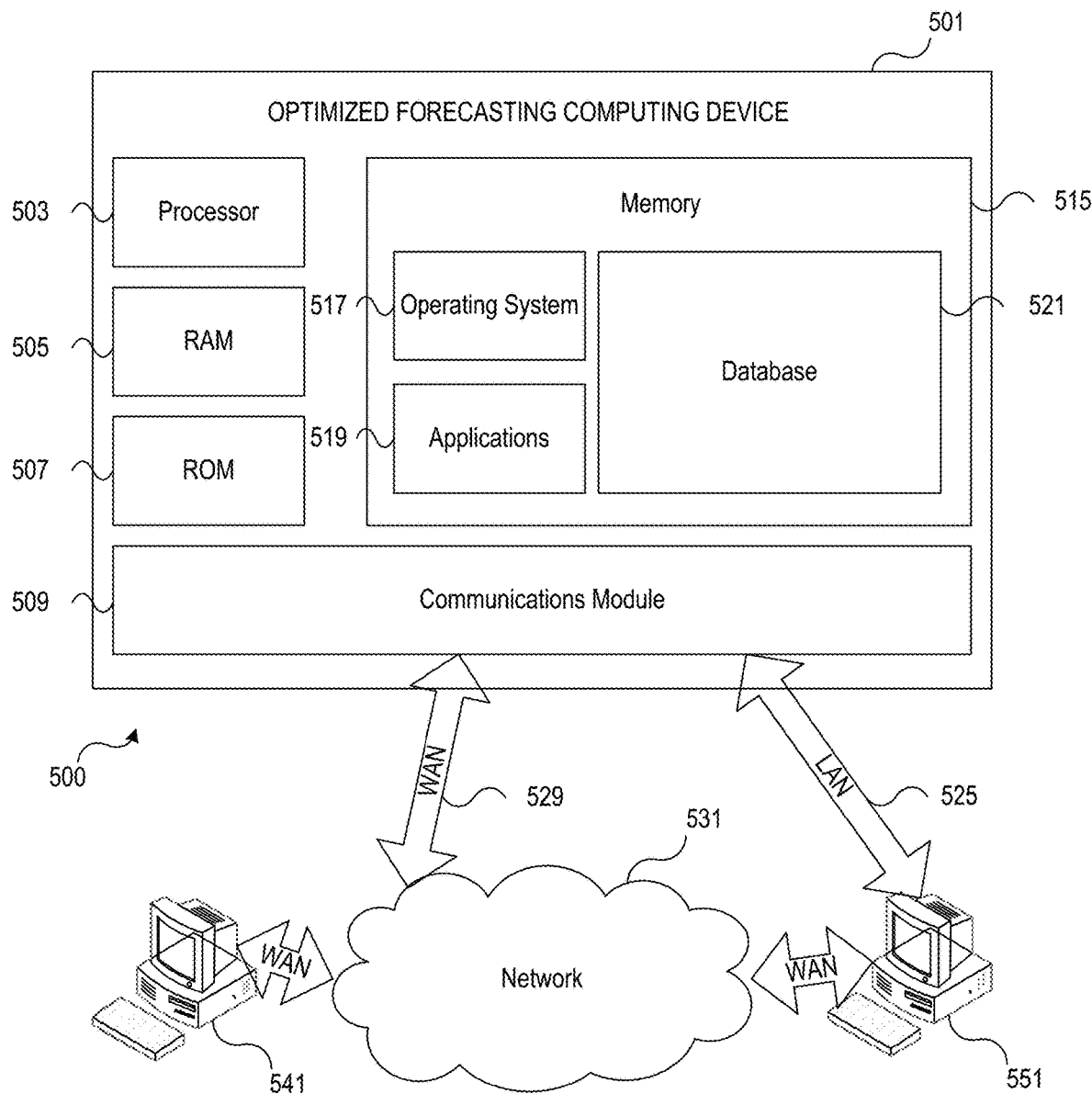
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include optimized forecasting computing device 501 having processor 503 for controlling overall operation of optimized forecasting computing device 501 and its associated components, including Random Access Memory (RAM) 505, Read-Only Memory (ROM) 507, communications module 509, and memory 515. Optimized forecasting computing device 501 may include a variety of computer readable media. Computer readable media may be any available media that may be accessed by optimized forecasting computing device 501, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by optimized forecasting computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on optimized forecasting computing device 501. Such a processor may execute computer-executable instructions stored on a computer-readable medium.

Software may be stored within memory 515 and/or storage to provide instructions to processor 503 for enabling optimized forecasting computing device 501 to perform various functions as discussed herein. For example, memory 515 may store software used by optimized forecasting computing device 501, such as operating system 517, application programs 519, and associated database 521. Also, some or all of the computer executable instructions for optimized forecasting computing device 501 may be embodied in hardware or firmware. Although not shown, RAM 505 may include one or more applications representing the application data stored in RAM 505 while optimized forecasting computing device 501 is on and corresponding software applications (e.g., software tasks) are running on optimized forecasting computing device 501.

Communications module 509 may include a microphone, keypad, touch screen, and/or stylus through which a user of optimized forecasting computing device 501 may provide input, and may also include one or more of a speaker for providing audio output and a video display device for providing textual, audiovisual and/or graphical output. Computing system environment 500 may also include optical scanners (not shown).

Optimized forecasting computing device 501 may operate in a networked environment supporting connections to one or more remote computing devices, such as computing devices 541 and 551. Computing devices 541 and 551 may be personal computing devices or servers that include any or all of the elements described above relative to optimized forecasting computing device 501.

The network connections depicted in FIG. 5 may include Local Area Network (LAN) 525 and Wide Area Network (WAN) 529, as well as other networks. When used in a LAN networking environment, optimized forecasting computing device 501 may be connected to LAN 525 through a network interface or adapter in communications module 509. When used in a WAN networking environment, optimized forecasting computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
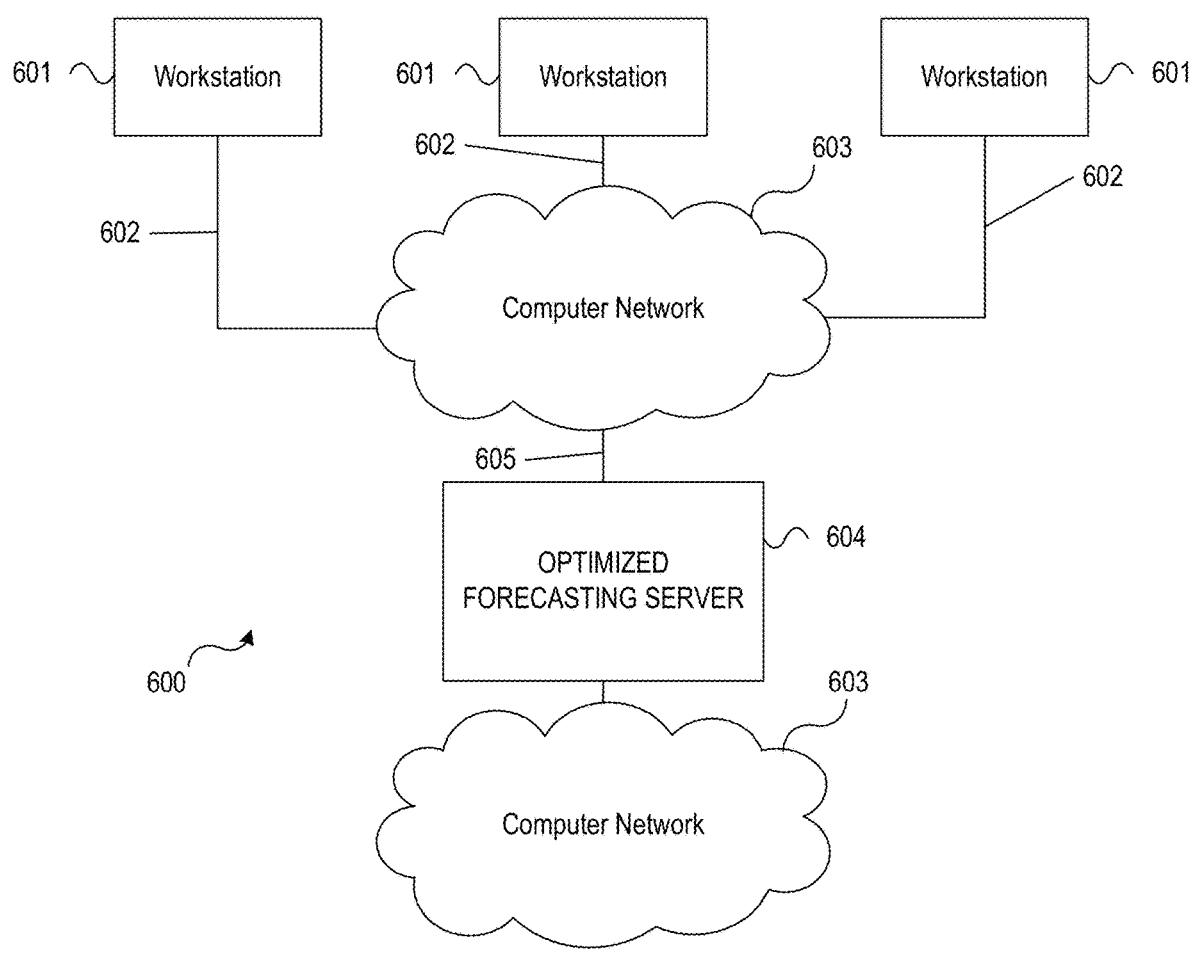
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to optimized forecasting server 604. In system 600, optimized forecasting server 604 may be a server, processor, computer, or data processing device, or combination of the same, configured to perform the functions and/or processes described herein. Server 604 may be used to receive strategy data, receive industry data, initiate capture of user data, analyze the user data to determine competency level, analyzing the strategy data, industry data and competency level to identify any deficiencies between resources needed and available and generate one or more actions for execution, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and optimized forecasting server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive enterprise strategy data from a first enterprise unit;
   receive external industry data;
   generate an instruction to capture user data, the instruction to capture user data including an instruction to activate keystroke sensors associated with one or more data capture devices;
   transmit the generated instruction to a plurality of enterprise user computing devices;
   continuously capture, in real-time and via the keystroke sensors associated with the one or more data capture devices and for the plurality of enterprise user computing devices, data associated with user performance of each enterprise user of the plurality of enterprise user computing devices, the captured data including at least keystroke data received from the activated keystroke sensors as a user generates specific code using a particular programming language;
   analyze, by a machine learning engine and using one or more machine learning datasets, the one or more machine learning datasets including data linking keystroke data to competency for a job skill, the captured data associated with user performance to determine a competency level of each enterprise user;
   analyze, by the machine learning engine and using the one or more machine learning datasets, the one or more machine learning datasets further including data identifying deficiencies based on sequences or patterns in enterprise strategy data, the determined competency level of each enterprise user, the enterprise strategy data, and the external industry data to determine whether a deficiency exists between resources needed for an enterprise strategy and resources available based on the determined competency level of each enterprise user;
responsive to determining, based on the analyzing, that a deficiency exists, generate one or more actions to execute to remedy the identified deficiency;
execute the one or more actions;
after executing the one or more actions, receive additional sensor data associated with user performance for a first user;
analyze, by the machine learning engine, the additional sensor data to modify a competency level of the first user; and
validate, by the machine learning engine, the one or more machine learning datasets based on the additional sensor data.

2. The computing platform of claim 1, wherein the enterprise strategy data includes identification of the resources needed for the enterprise strategy.

3. The computing platform of claim 1, wherein the external industry data is received from an external data source and includes trend data associated with in-demand job skills.

4. The computing platform of claim 1, wherein the keystroke data includes data identifying a number of errors made when generating the specific code in the particular programming language.

5. The computing platform of claim 1, wherein analyzing the received data associated with user performance to determine a competency level of each enterprise user further includes comparing a document generated by a user to a master document to identify errors in the document.

6. A method, comprising:
receiving, by a computing platform having a communication interface, at least one processor and memory, enterprise strategy data from a first enterprise unit;
receiving, by the computing platform and via the communication interface, external industry data;
generating, by the at least one processor, an instruction to capture user data, the instruction to capture user data including an instruction to activate keystroke sensors associated with one or more data capture devices;
transmitting, by the at least one processor and via the communication interface, the generated instruction to a plurality of enterprise user computing devices;
continuously capturing, in real-time and via the keystroke sensors associated with the one or more data capture devices and for the plurality of enterprise user computing devices, data associated with user performance of each enterprise user of the plurality of enterprise user computing devices, the captured data including at least keystroke data received from the activated keystroke sensors as a user generates specific code using a particular programming language;
analyzing, by a machine learning engine of the computing platform and using one or more machine learning datasets, the one or more machine learning datasets including data linking keystroke data to competency for a job skill, the captured data associated with user performance to determine a competency level of each enterprise user;
analyzing, by the machine learning engine of the computing platform and using the one or more machine learning datasets, the one or more machine learning datasets further including data identifying deficiencies based on sequences or patterns in enterprise strategy data, the determined competency level of each enterprise user, the enterprise strategy data, and the external industry data to determine whether a deficiency exists between resources needed for an enterprise strategy and resources available based on the determined competency level of each enterprise user;
responsive to determining, based on the analyzing, that a deficiency exists, generating, by the at least one processor, one or more actions to execute to remedy the identified deficiency;
executing, by the at least one processor, the one or more actions;
after executing the one or more actions, receiving, by the at least one processor and via the communication interface, additional sensor data associated with user performance of a first user;
analyzing, by the machine learning engine, the additional sensor data to modify a competency level of the first user; and
validating, by the machine learning engine, the one or more machine learning datasets based on the additional sensor data.

7. The method of claim 6, wherein the enterprise strategy data includes identification of the resources needed for the enterprise strategy.

8. The method of claim 6, wherein the external industry data is received from an external data source and includes trend data associated with in-demand job skills.

9. The method of claim 6, wherein the keystroke data includes data identifying a number of errors made when generating the specific code in the particular programming language.

10. The method of claim 6, wherein analyzing the received data associated with user performance to determine a competency level of each enterprise user further includes comparing a document generated by a user to a master document to identify errors in the document.

11. One or more non-transitory computer-readable media storing instructions that, when executed by a computing platform comprising at least one processor, memory, and a communication interface, cause the computing platform to:
receive enterprise strategy data from a first enterprise unit;
receive external industry data;
generate an instruction to capture user data, the instruction to capture user data including an instruction to activate keystroke sensors associated with one or more data capture devices;
transmit the generated instruction to a plurality of enterprise user computing devices;
continuously capture, in real-time and via the keystroke sensors associated with the one or more data capture devices and for the plurality of enterprise user computing devices, data associated with user performance of each enterprise user of the plurality of enterprise user computing devices, the captured data including at least keystroke data received from the activated keystroke sensors as a user generates specific code using a particular programming language;
analyze, by a machine learning engine and using one or more machine learning datasets, the one or more machine learning datasets including data linking keystroke data to competency for a job skill, the captured data associated with user performance to determine a competency level of each enterprise user;
analyze, by the machine learning engine and using the one or more machine learning datasets, the one or more machine learning datasets further including data identifying deficiencies based on sequences or patterns in enterprise strategy data, the determined competency level of each enterprise user, the enterprise strategy data, and the external industry data to determine whether a deficiency exists between resources needed for an enterprise strategy and resources available based on the determined competency level of each enterprise user;

responsive to determining, based on the analyzing, that a deficiency exists, generate one or more actions to execute to remedy the identified deficiency;

execute the one or more actions;

after executing the one or more actions, receive additional sensor data associated with user performance of a first user;

analyze, by the machine learning engine, the additional sensor data to modify a competency level of the first user; and validate, by the machine learning engine, one or more machine learning datasets based on the additional sensor data.

12. The one or more non-transitory computer-readable media of claim 11, wherein the enterprise strategy data includes identification of the resources needed for the enterprise strategy.

13. The one or more non-transitory computer-readable media of claim 11, wherein the external industry data is received from an external data source and includes trend data associated with in-demand job skills.

14. The one or more non-transitory computer-readable media of claim 11, the keystroke data includes data identifying a number of errors made when generating the specific code in the particular programming language.

15. The one or more non-transitory computer-readable media of claim 11, wherein analyzing the received data associated with user performance to determine a competency level of each enterprise user further includes comparing a document generated by a user to a master document to identify errors in the document.

* * * * *